C. MATSON.
ARMOR FOR PNEUMATIC TIRES.
APPLICATION FILED NOV. 4, 1912.
1,087,312.
Patented Feb. 17, 1914.
2 SHEETS—SHEET 1.
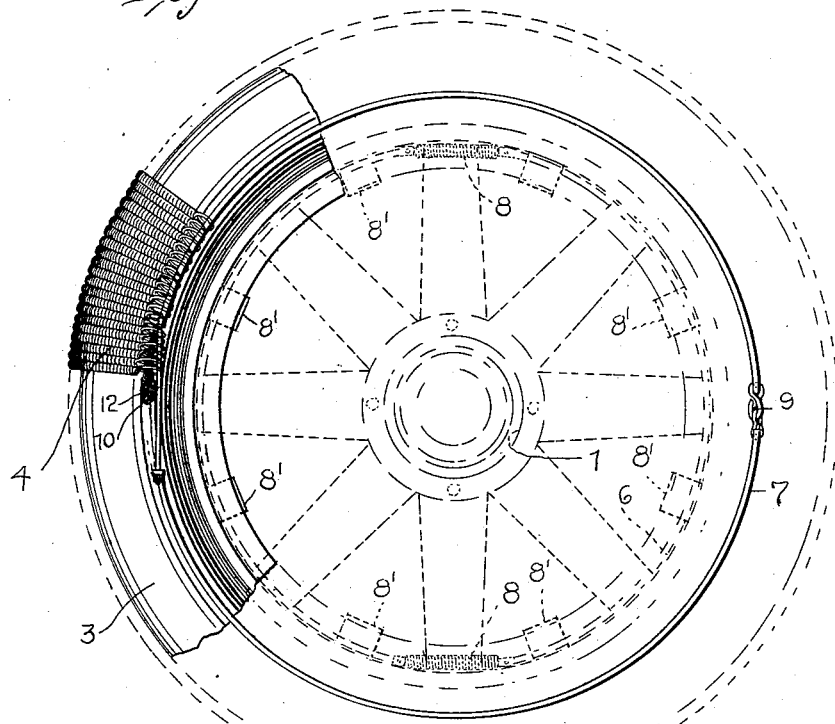
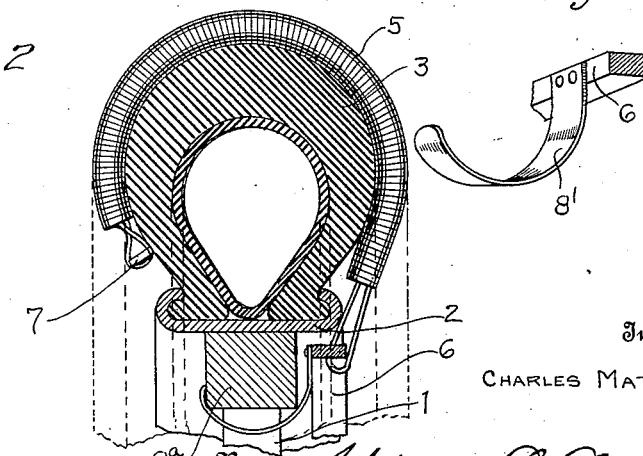
Witnesses
Robert M. Sutphen
A. L. Hind
Inventor
Charles Matson
By Watson E. Coleman
Attorney C. MATSON.
ARMOR FOR PNEUMATIC TIRES.
APPLICATION FILED NOV. 4, 1912.
1,087,312.
Patented Feb. 17, 1914.
2 SHEETS—SHEET 2.
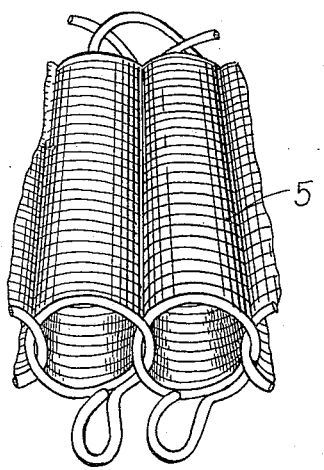
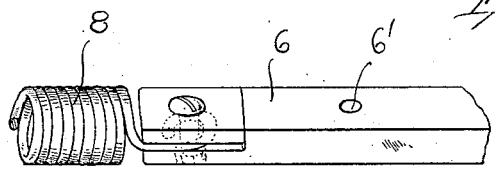
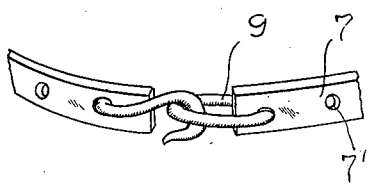
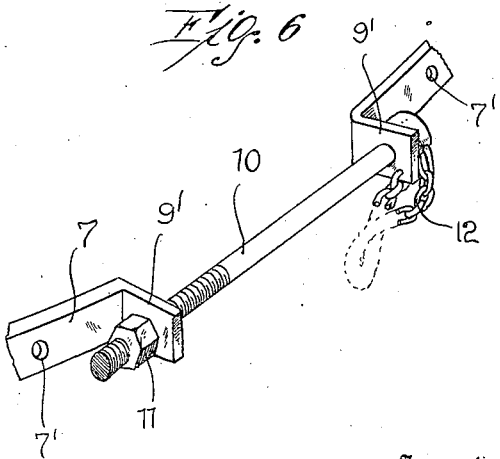
Inventor
CHARLES MATSON.
Witnesses

UNITED STATES PATENT OFFICE.

CHARLES MATSON, OF ELIZABETH, NEW JERSEY, ASSIGNOR OF ONE-HALF TO ERNEST HUCH AND ONE-HALF TO RUDOLPH BURKART, BOTH OF ALDENE, NEW JERSEY.

ARMOR FOR PNEUMATIC TIRES.

1,087,312.   Specification of Letters Patent.   Patented Feb. 17, 1914.

Application filed November 4, 1912. Serial No. 729,405.

*To all whom it may concern:*

Be it known that I, CHARLES MATSON, a citizen of the United States, residing at Elizabeth, in the county of Union and State of New Jersey, have invented certain new and useful Improvements in Armor for Pneumatic Tires, of which the following is a specification, reference being had to the accompanying drawings.

This invention relates to new and useful improvements in armors for pneumatic tires and has for its object to provide a device of this character which may be quickly and readily applied to use and which will effectually carry out the purpose for which the same is designed.

Still another object of the invention resides in providing a pair of stay bands secured to the ends of the coil springs, one of said bands being expansible and contractible and the other of said bands being formed in hinged sections.

Still another object of the invention resides in providing a device which is extremely simple and durable in construction, inexpensive to manufacture and one which will be very efficient and useful in operation.

With these and other objects in view, the invention consists in the novel features of construction, combination and arrangement of parts as will be hereinafter referred to and more particularly pointed out in the specification and claims.

In the accompanying drawings forming a part of this application, Figure 1 is a fragmentary side elevation of a wheel showing a portion of my device applied to use thereon. Fig. 2 is a vertical transverse section through the wheel with the device applied. Fig. 3 is a perspective view showing the interlocking of the coil springs forming a tire armor. Fig. 4 is a fragmentary perspective view of the inner expansible band showing the manner of securing the coil spring in its length. Fig. 5 is a similar view of the outer band showing the hinging means between the sections thereof. Fig. 6 is a fragmentary perspective view showing the manner of securing the ends of the sections of the outer band; and Fig. 7 is a similar view of one of the hook members used in connection with the inner expansible band.

In describing my invention, I shall refer to the drawings in which similar reference characters designate corresponding parts throughout the several views and in which 1 indicates a wheel of the usual or any preferred type, used on motor vehicles, the rim 2 of which has a tire 3 applied thereto.

My invention comprises a shoe or the like 4 which is composed of a plurality of coil springs 5, and a pair of stay bands or rings 6 and 7 respectively, of unequal diameters, said coil springs having the ends thereof looped into engagement with said stay bands. Certain of the loops at the ends of these coil springs receive the bands therethrough, while certain other of the loops extend through openings 6′ and 7′ respectively in said bands 6 and 7, whereby said springs will be held in place on said bands. In view of the particular manner in which the coil springs extend with respect to the tire over which the shoe is adapted to be disposed, said springs may be said to extend transversely of the device, the advantages of which, in a device of this type, are obvious.

The band or ring 6, which is of smaller diameter than the band 7, consists of two sections, the ends of which are spaced from one another and connected together by means of the strong coil springs 8 and as there are two of such springs in the periphery of the ring or band at diametrically opposite points thereon, the latter may be said to be a contractible or expansible band. This contractible and expansible band is adapted to be fitted within the rim 2, it being appreciated that the springs 8, forcing outwardly on the sections thereof, will cause the same to tightly fit therewithin and in order to aid in the retention of said band in position, the inwardly curved hook members 8′ are secured on the inner face of said band. These members are adapted to be hooked around the felly 8ª as clearly shown in Fig. 2 of the drawings, and through this medium, it will be understood that said band will be securely held in place. The band or ring 7 is also composed of a pair of sections, hinged or linked together at their ends, as shown at 9. The opposite ends of the sections of this band are bent laterally as shown at 9′ and have a bolt 10 extending therethrough, the threaded end of said bolt having a nut 11 engaged therewith, whereby the sections may be drawn together and held in position. The head of this bolt is connected to one of the lateral extensions by means of a flexible connection 12 to prevent the loss thereof.

In practice, when it is desired to apply the armor to use, the inner or smaller band or ring 6 is first applied to the inner periphery of the rim 2, it being appreciated that said ring or band may be applied to rims of various sizes, in view of its expansible and contractible qualities. The springs 8 within the periphery of the band 6 are of considerable strength and it will be appreciated that when once applied, said ring or band is adapted to fit snugly within the rim, but the hooks 8' are further engaged with the felly of the wheel to prevent any possibility of the rim being removed during the use of the device. In applying this band 6 in position, the coil springs of the shoe are simultaneously drawn over the tire proper to allow said tire to fit entirely within said shoe and this operation is readily accomplished in view of the fact that the band or ring 7 consists of two hinged members. When so applied, the adjusting bolt 10 is properly engaged with the ends of the two members composing said ring 7 and when the nut is engaged with said bolt, and turned home thereon, the band will be contracted to draw the shoe tightly and securely over the tire. When once positioned in this manner, the wheel, with the protector thereon is adapted for use and it will be seen that my improved device will form a perfect armor for the tire to lengthen the life and mileage thereof and also form an antiskidding means for the same.

From the foregoing it will be seen that I have provided a simple, inexpensive and efficient means for carrying out the objects of the invention and while I have particularly described the elements best adapted to perform the functions set forth, it is obvious that various changes in form, proportion and in the minor details of construction may be resorted to without departing from the spirit or sacrificing any of the principles of the invention.

Having thus described this invention, what I claim is:—

1. In a tire armor, a yielding casing cover, a band engaged with one side edge of said cover and formed of a pair of rigid sections, a pair of coil springs removably secured between the ends of said sections to provide a band capable of expansion and contraction, said band being adapted for disposition within the rim of the wheel to fit snugly therein, and means engaged with the other side edge of the casing cover to secure the latter in position on a tire.

2. In a tire armor, a yielding casing cover, a band engaged with one side edge thereof and formed of a pair of rigid sections, a pair of coil springs removably secured between the ends of said sections to provide a band capable of expansion and contraction, said band being adapted for disposition within the rim of a wheel to fit snugly therein, a plurality of hook members carried on said band adapted for engagement with the felly of the wheel to aid in the retention of the band in position thereon, and means engaged with the opposite side edge of the casing cover to clamp the latter tightly over the tire.

3. In a tire armor, a yielding casing cover, a band engaged with one side edge thereof and formed of a pair of rigid sections, the ends of said sections being partially cut away to provide offsets therein, a pair of coil springs disposed between the adjacent ends of the rigid sections of said band, means clamping the ends of said coil springs in the offset portions of said sections of the band to provide a complete band capable of expansion and contraction, said band being adapted for disposition within the rim of a wheel to fit snugly therein, means carried on said band adapted for engagement with the felly of the wheel to retain said band in position thereon, and means engaged with the opposite side edge of the casing cover to securely clamp the latter in position on a tire.

In testimony whereof I hereunto affix my signature in the presence of two witnesses.

CHARLES MATSON.

Witnesses:
 THEO. REINECKE,
 RUDOLF BURKART.